(12) United States Patent
Keshavaraj (10) Patent No.: US 7,393,011 B2
(45) Date of Patent: Jul. 1, 2008

(54) AIRBAG WITH FLOATING TETHERS

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 332 days.

(21) Appl. No.: 11/361,382

(22) Filed: Feb. 24, 2006

(65) Prior Publication Data

US 2007/0200320 A1 Aug. 30, 2007

(51) Int. Cl.
*B60R 21/16* (2006.01)
*B60R 21/239* (2006.01)

(52) U.S. Cl. ............... 280/743.2; 280/739; 280/753
(58) Field of Classification Search ............ 280/743.2, 280/732, 739, 742, 730.1, 753
See application file for complete search history.

(56) References Cited

U.S. PATENT DOCUMENTS

| | | | |
|---|---|---|---|
| 5,845,935 A * | 12/1998 | Enders et al. ............ | 280/743.2 |
| 5,931,493 A | 8/1999 | Sutherland ............... | 280/730.1 |
| 6,648,371 B2 * | 11/2003 | Vendely et al. ............ | 280/739 |
| 6,932,385 B2 | 8/2005 | Hawthorn et al. ........... | 280/739 |
| 7,275,762 B2 * | 10/2007 | Miyata .................... | 280/743.2 |
| 7,328,915 B2 * | 2/2008 | Smith et al. ................ | 280/739 |
| 2006/0071462 A1 * | 4/2006 | Smith et al. ................ | 280/739 |
| 2007/0045997 A1 * | 3/2007 | Abe et al. ................... | 280/729 |
| 2007/0145729 A1 * | 6/2007 | Ishiguro et al. ............. | 280/739 |

* cited by examiner

*Primary Examiner*—Ruth Ilan
*Assistant Examiner*—Drew J. Brown
(74) *Attorney, Agent, or Firm*—Terry T. Moyer; John E. Vick, Jr.

(57) ABSTRACT

An airbag assembly including one or more elongate tether elements that extend through vent openings along travel paths from anchoring locations such that the tether elements extend in sliding relation through the vent openings. The gas emission capacity of the vent openings may be adjustable based on internal cushion pressure.

19 Claims, 7 Drawing Sheets

AIRBAG WITH FLOATING TETHERS

TECHNICAL FIELD

This invention relates to an air bag assembly and more particularly to an airbag assembly including an inflatable airbag cushion in communication with a gas emitting inflator. One or more tether elements extend through vent openings and across the cushion such that the tether elements extend in sliding relation across the vent openings. The vent openings may be adjusted based on internal cushion pressure.

BACKGROUND OF THE INVENTION

It is well known to provide an airbag assembly including an inflatable airbag cushion for protecting the occupant of a transportation vehicle. In an automotive vehicle such air bag assemblies are typically located within the hub of the steering wheel and in positions opposing the knees and/or torso of a side passenger. Additional air bag assemblies may be located within the seats and/or door panels for protection of the occupants during a side-impact event.

One particular type of airbag assembly is an inflation driven bolster disposed in opposing relation to an occupant's lower extremities. Such systems typically incorporate an inflatable cushion disposed in an instrument panel behind an outer occupant contact surface in the form of a plate which is covered by a layer of foam with a aesthetic polymeric skin or fabric. Upon activation, the cushion inflates and pushes the plate into contact with the occupant's knees thereby providing early stage dissipation of kinetic energy. By way of example only, and not limitation, one such system is illustrated and described in U.S. Pat. No. 5,931,493 to Sutherland the contents of which are hereby incorporated by reference in their entirety.

As will be appreciated, when an airbag cushion in a knee bolster or other airbag assembly is activated, the pressure is generally proportional to the quantity of inflator gas expelled into the airbag and inversely proportional to the volume occupied by the gas. As the occupant comes into contact with the expanded airbag or outer contact surface, the inflator gas is forced out of the air bag thereby dissipating the kinetic energy of the occupant achieving a so called "ride down" effect. In order to facilitate the discharge of inflator gas from the airbag it is common to incorporate vents in the form of normally open fixed diameter apertures across the walls of the airbag.

In order to provide additional control over the inflation characteristics of the airbag cushion it is known to use tethering elements in the form of straps or webs extending between surfaces of the airbag and anchoring points on structural members. It has also been proposed to use elongate tethers in attached relation to vent closing members to facilitate adjustable venting. Such systems are illustrated and described in U.S. Pat. No. 6,932,385 to Hawthorn et al. the contents of which are hereby incorporated by reference as if fully set forth herein.

SUMMARY OF THE INVENTION

The present invention provides advantages and alternatives over the prior art by providing an airbag assembly including one or more elongate tether elements that extend through vent openings along travel paths from anchoring locations such that the tether elements extend in sliding relation through the vent openings. The gas emission capacity of the vent openings may be adjustable based on internal cushion pressure.

The air bag assembly reduces the number of tether attachments that must be formed during construction thereby simplifying assembly and reducing the number of fabric perforation seams. At the same time, tethering performance is substantially retained.

According to one exemplary embodiment, the airbag assembly may be a knee bolster assembly, wherein one or more elongate tethers extend from a support structure through vent openings and across an interior portion of an inflatable cushion in operative connecting relation with a plate or other occupant contact structure.

BRIEF DESCRIPTION OF THE DRAWINGS

The present invention will now be described by way of example only, with reference to the accompanying drawings which constitute a part of the specification herein and in which.

While the invention has been illustrated and generally described above and will hereinafter be described in connection with certain potentially preferred embodiments, procedures and practices, it is to be understood that in no event is the invention to be limited to such illustrated and described embodiments procedures and practices. On the contrary, it is intended that the present invention shall extend to all alternatives and modifications as may embrace the principles of this invention within the true spirit and scope thereof. In particular, it is to be understood that while illustrations and descriptions are provided relative to an exemplary knee bolster system, the invention is in no way limited to such a system. Rather, it is contemplated that the invention may extend to any airbag system utilizing tethers including driver side, passenger side and side curtain airbags.

DETAILED DESCRIPTION

Figure 1:
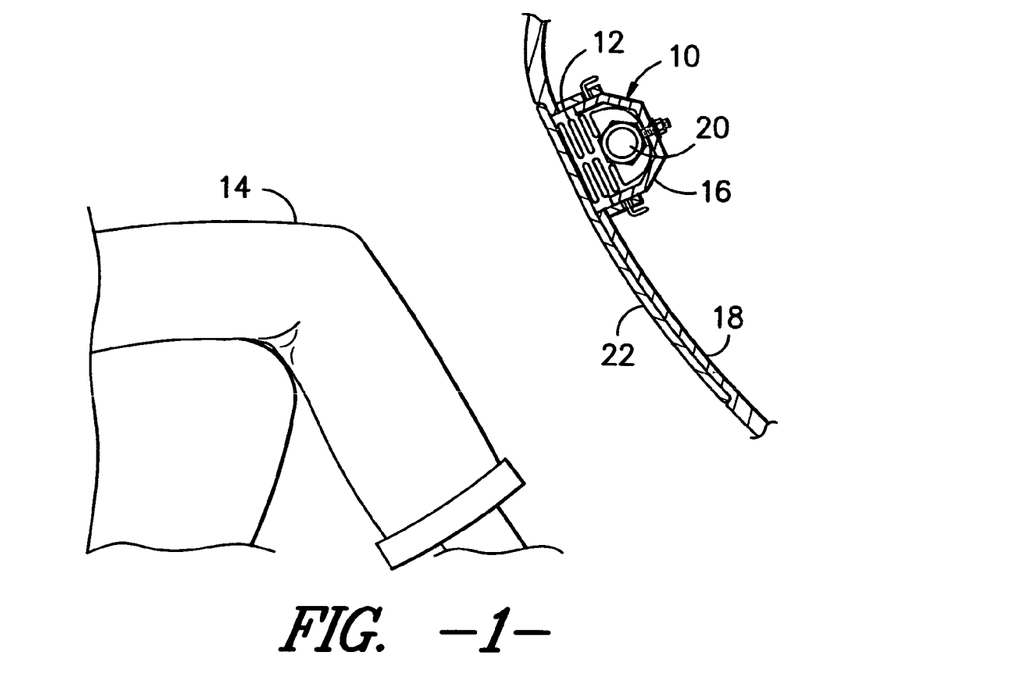
FIG. 1 is a sectional view illustrating an airbag assembly in the form of an inflation driven knee bolster prior to activation.
Figure 1A:
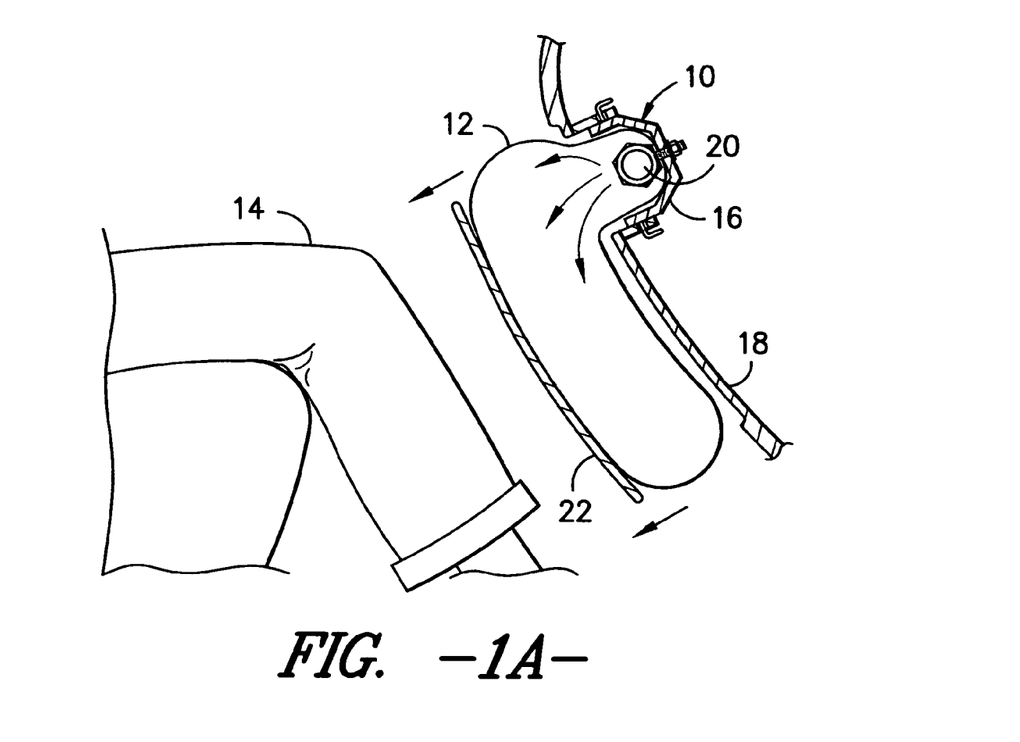
FIG. 1A is a view similar to FIG. 1 illustrating the assembly during activation.

Reference will now be made to the drawings, wherein to the extent possible like reference numerals are utilized to designate like components throughout the various views. In FIGS. 1 and 1A an interior portion of a transportation vehicle such as an automobile, train, airplane or the like is illustrated. As shown, an airbag system 10 incorporating an inflatable cushion 12 such as a sewn bag of textile material or the like is disposed in opposing relation to a vehicle occupant 14 such as a passenger or operator.

In the illustrated embodiment, the cushion 12 is held within a chamber 16 such as an open ended housing or the like at the interior of an instrument panel 18. The cushion 12 is in fluid communication with a gas emitting inflator 20. In the illustrated embodiment a displaceable occupant impact panel 22 is supported in overlying relation to the cushion 12 for projection outwardly towards the occupant 14 upon inflation of the cushion 12 as shown in FIG. 1A. In the event that the cushion 12 is to directly impact the occupant 14, the impact panel 22 may be replaced by a door or other displaceable structure.

Under normal conditions the cushion 12 is held in folded relation within the instrument panel 18. Upon the occurrence of a collision or other activating event, gas is emitted from the inflator 20 and into the cushion 12. Gas pressure causes the cushion 12 to push the impact panel 22 outwardly while simultaneously acting as a cushion behind the impact panel. Various tethering arrangements such as those illustrated in FIGS. 3-5 which will be discussed further hereinafter may be used to maintain an operative controlled connection between the impact panel 22 and the support structure of the instrument panel 18.

As indicated previously, while the airbag cushion 12 is illustrated for descriptive purposes in a bolster system in opposed relation to the knees of a vehicle occupant, it is to be understood that the present invention is in no way intended to be limited to such a configuration. On the contrary, it is contemplated that the present invention may have equal applicability to airbag deployment in opposing relation to the upper torso of an operator from the steering column (not shown) or in opposing relation to the upper torso of a passenger as well as in relation to airbags deployed from other regions within the vehicle interior including, by way of example only, side-impact air bags and inflatable curtain structures. Accordingly, it is contemplated that the cushion 12 may have any suitable shape and may be deployed at any position relative to the occupant 14 as may be desired.

Figure 2:
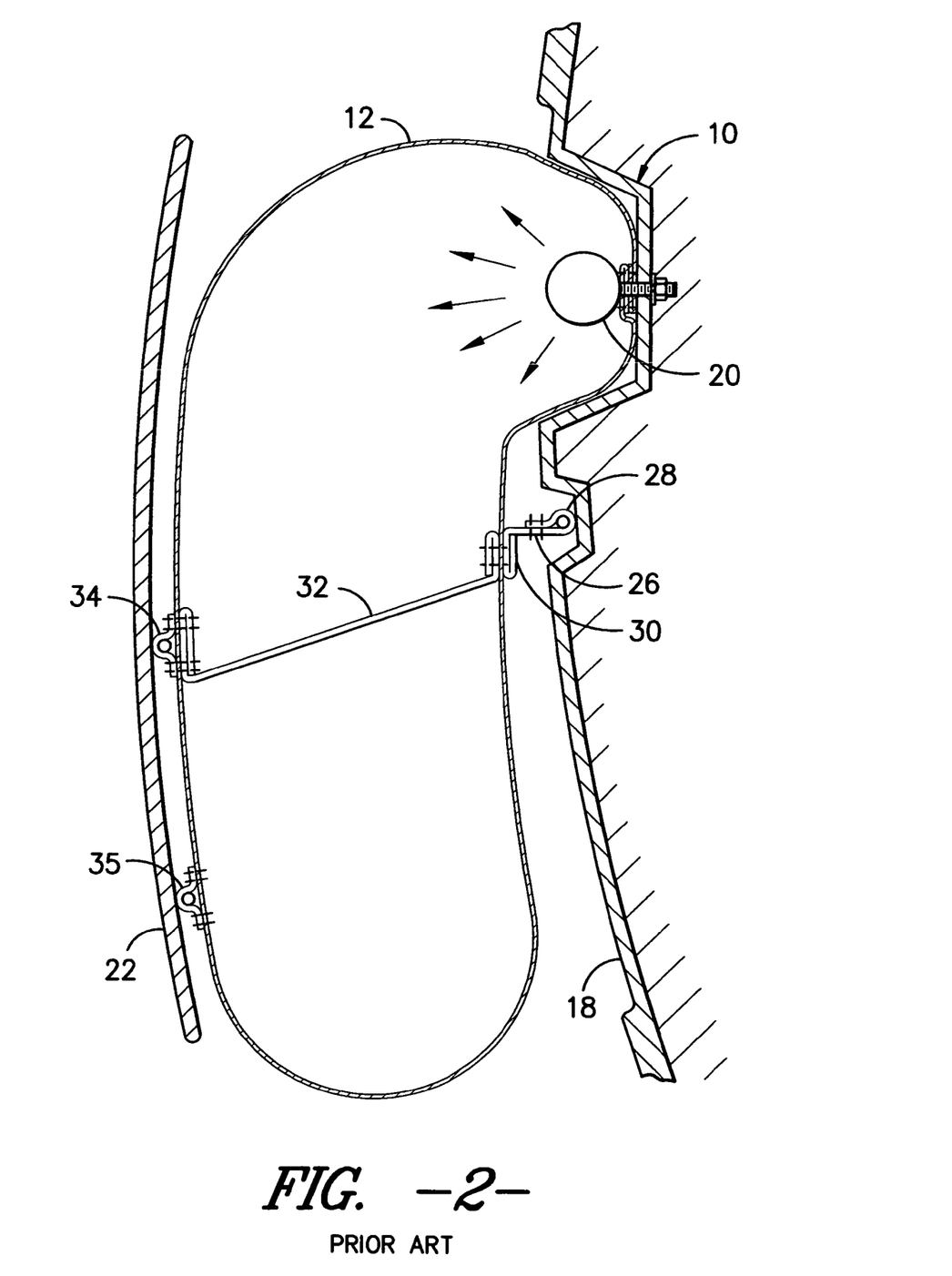
FIGS. 2, 2A and 2B illustrate various prior tethering systems that have been used in knee bolster airbag assemblies.
Figure 2A:
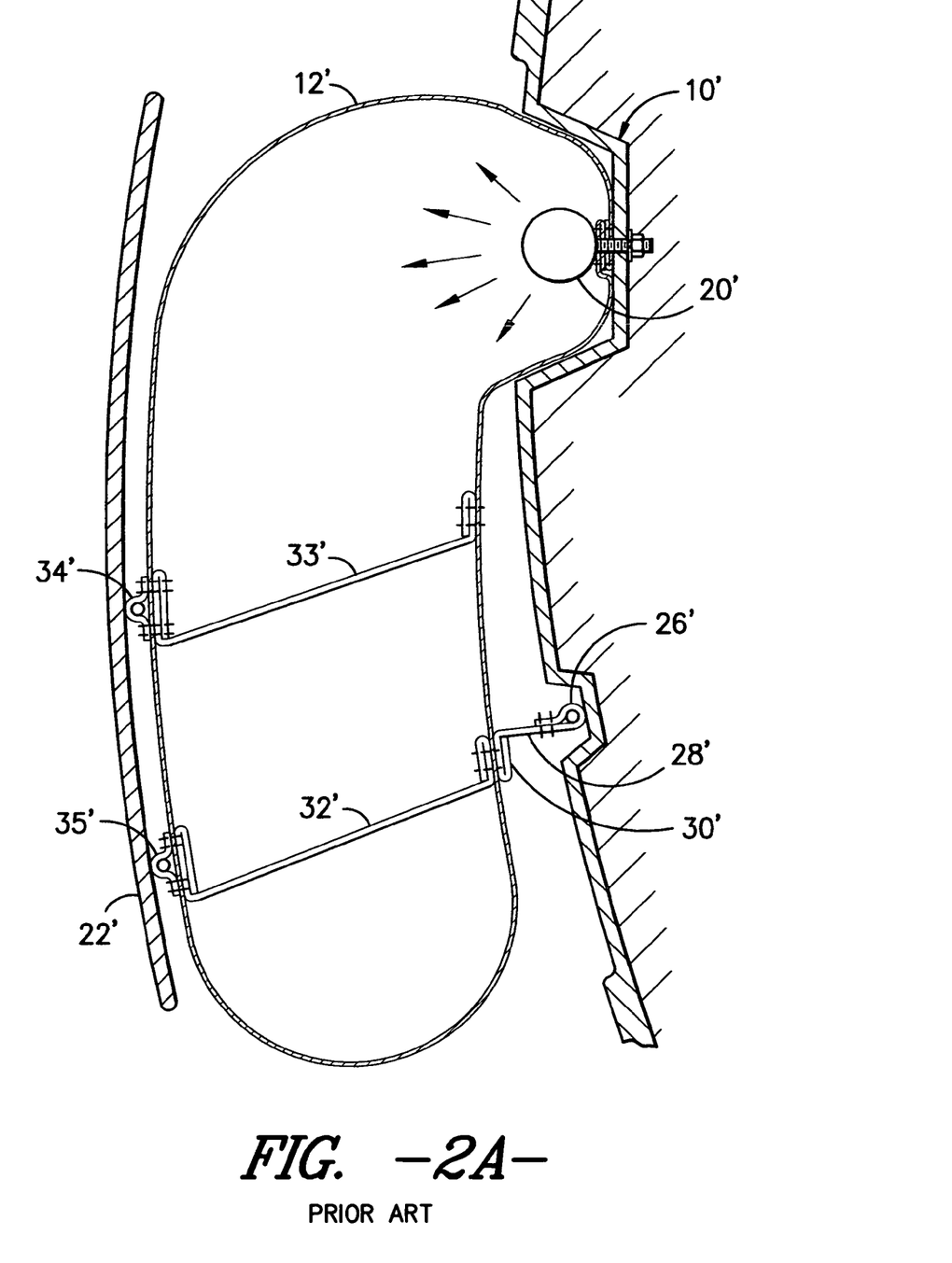
Figure 2B:
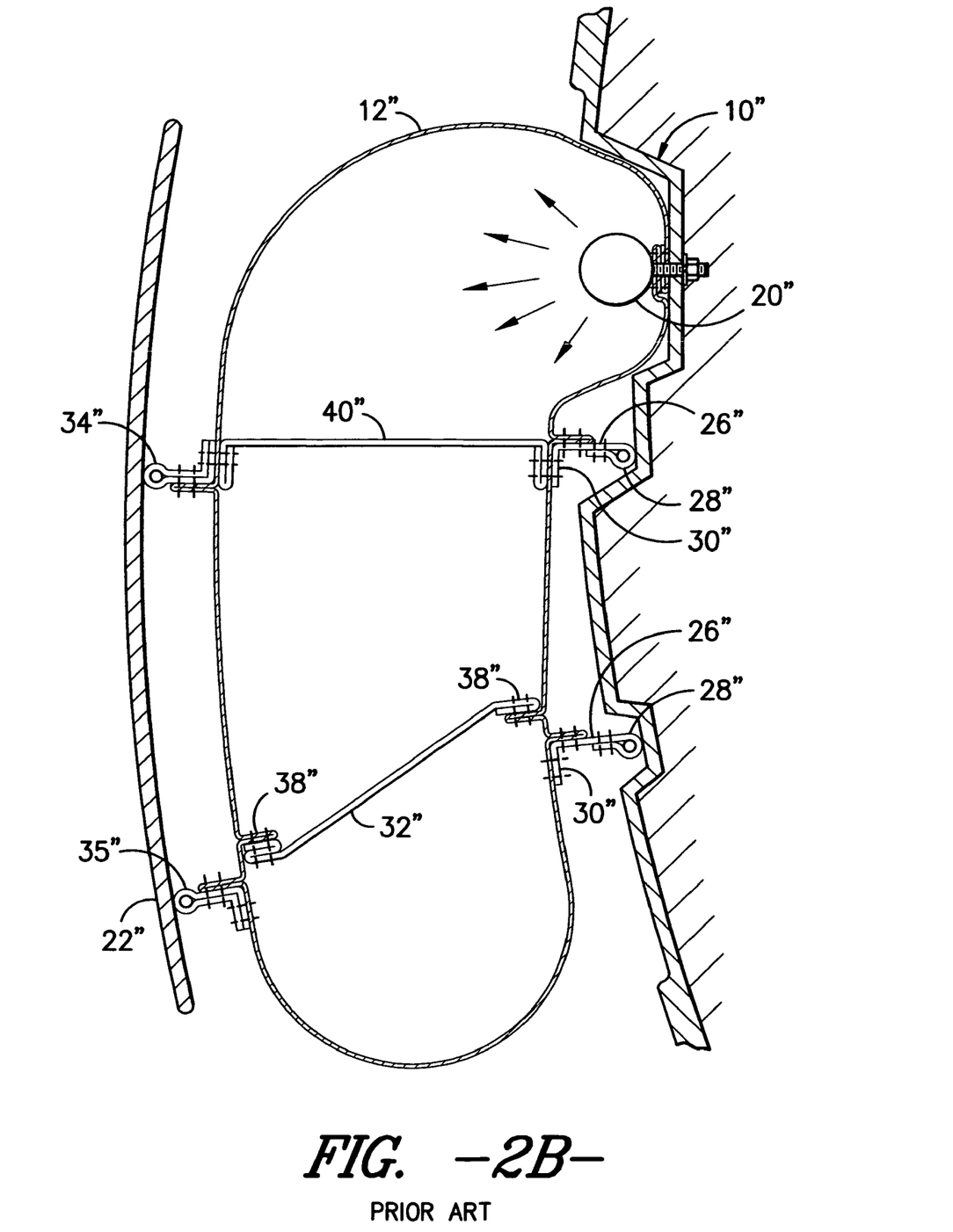

As indicated previously, the final deployed position of the impact panel 22 and shape of the cushion 12 may be at least partially controlled by one or more tether elements extending between anchor positions and the cushion 12. By way of example only, various prior tether constructions which have been used are illustrated in FIGS. 2, 2A and 2B. Such tether constructions may have been used either independently or in some combination with one another.

As illustrated in FIG. 2, in a first prior tether construction, an elongate strap 26 extends from an anchor position 28 to a seamed connection 30 at the exterior of the cushion 12. In this construction an interior tether member 32 in the form of a strap or web is attached across an interior portion of the cushion 12. The seamed connection 30 operatively connects the strap 26 to one end of the interior tether member 32. Tether element 34 is seamed through the exterior of the cushion 12 to interior tether member 32 and is connected to an interior surface of the impact panel 22. Tether element 35 is seamed through the exterior of the cushion 12 and is connected to an interior surface of the impact panel 22.

A second prior tether construction is illustrated in FIG. 2A, wherein elements corresponding to those previously described are designated by like reference numerals with a prime. In this construction an elongate strap 26' extends from an anchor position 28' to a seamed connection 30' at the exterior of the cushion 12'. In this construction a first interior tether member 32' in the form of a strap or web is attached across an interior portion of the cushion 12'. The seamed connection 30' operatively connects the strap 26' to the first interior tether member 32' through the exterior of the cushion 12'. A second interior tether member 33' in the form of a strap or web is also attached across an interior portion of the cushion 12'. Tether element 34', 35' such as straps or the like are seamed through the exterior of the cushion 12' to interior tether members 33', 32' respectively and are connected to an interior surface of the impact panel 22'.

A third prior tether construction is illustrated in FIG. 2B, wherein elements corresponding to those previously described are designated by like reference numerals with a double prime. In this construction a pair of elongate straps 26" extends from anchor positions 28" to seamed connections 30" at the exterior of the cushion 12". In this construction a first interior tether member 32" in the form of a strap or web is attached across an interior portion of the cushion 12" by seam connections 38". The seamed connections 30" are remote from the seam connections 38". A second interior tether member 40" in the form of a strap or web is attached across an interior portion of the cushion 12". Tether element 34", 35" such as straps or the like are seamed through the exterior of the cushion 12" and are connected to an interior surface of the impact panel 22".

As will be appreciated, in each of the prior tethering arrangements illustrated and described in relation to FIGS. 2, 2A and 2B, the travel path of the tethers is interrupted at the cushion walls. The establishment of an operative connection between the internal and external tethering elements thus requires the formation of attachment seams. The introduction of such seams may require substantial skill and may increase manufacturing complexity.

Figure 3:
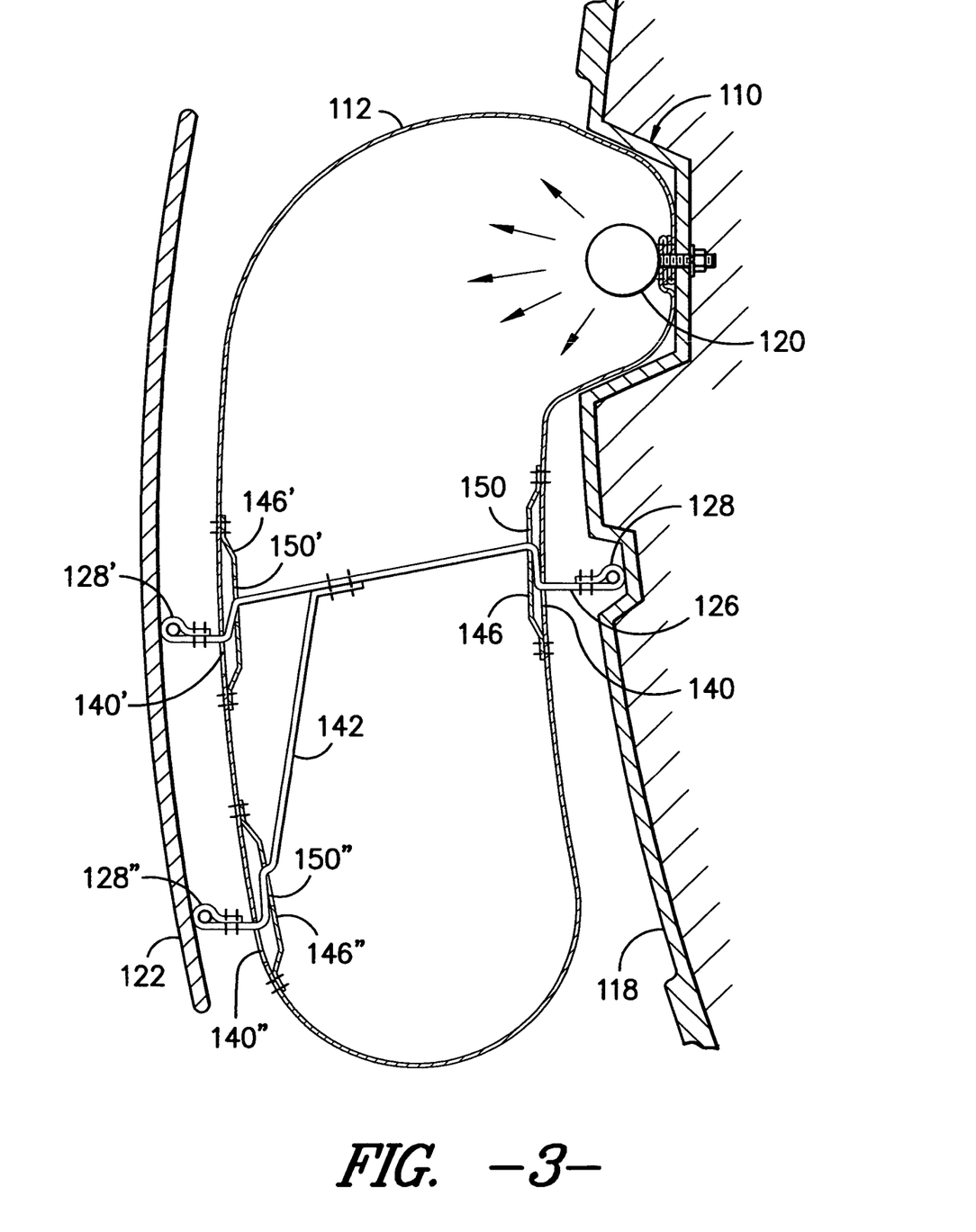
FIG. 3 is a view similar to FIG. 2 illustrating an exemplary tethering system incorporating elongate tethers extending in sliding relation through vent openings in airbag cushion walls.

It has been found that airbag tethering systems incorporating elongate tethering elements extending from anchor positions in sliding relation through openings in the cushion wall to the cushion interior may be used to substantially reduce complexity while maintaining the tethering function. By way of example only, and not limitation, FIG. 3 illustrates a contemplated tethering system wherein elements corresponding to those previously described are designated by like reference numerals increased by 100. In this arrangement a first elongate strap 126 extends from a first anchor position 128 at the instrument panel 118 along a travel path to a second anchor position 128' at the inner surface of the impact panel 122. Along the travel path, the first elongate strap 126 extends through vent openings 140, 140' in the cushion wall such that the first elongate strap slides or floats within the vent openings 140, 140'. In the exemplary construction a second elongate strap 142 may be attached to the first elongate strap 126 by stitching or the like and extends through a vent opening 140" for attachment to anchor position 128". Of course, the actual arrangement and number of tether elements may be adjusted depending upon the final desired configuration.

As illustrated, vent cover panels 146, 146', 146" of fabric, polymeric film or other pliable material are preferably disposed in attached opposing relation at least partially across the vent openings 140, 140', 140". As shown, the vent cover panels 146, 146', 146" are preferably attached to the walls of the cushion 112 by seams outboard of the vent openings. The attachment of the cover panels to the cushion walls may be by sewn seams, adhesive seams or the like as may be desired. The vent cover panels 146, 146', 146" preferably include openings 150, 150', 150" that are positioned out of alignment with the corresponding vent openings 140, 140', 140". The openings 150, 150', 150" may be at an interior portion of the cover panels or at a boundary edge such as by using a discontinuous seam attachment around the perimeter of the vent cover panels. As shown, the openings 150, 150', 150" are preferably sized so as to have a larger effective cross section than the elongate straps. Thus, the straps may normally slide freely through the openings in the vent cover panels.

In the illustrated construction wherein tethering straps extend through the vent openings 140, 140', 140" and misaligned openings 150, 150', 150", the introduction of inflation pressure may be used to substantially close the vent openings and lock down the tethering straps. Specifically, as pressure is built within the cushion 112, the portion of the vent cover panels overlying the vent openings is pushed into the vent openings in a plug-forming relation. As the vent openings 140, 140', 140" are closed, the tethering straps running through those opening are locked in place thus forming a secure tethering relation.

Figure 4:
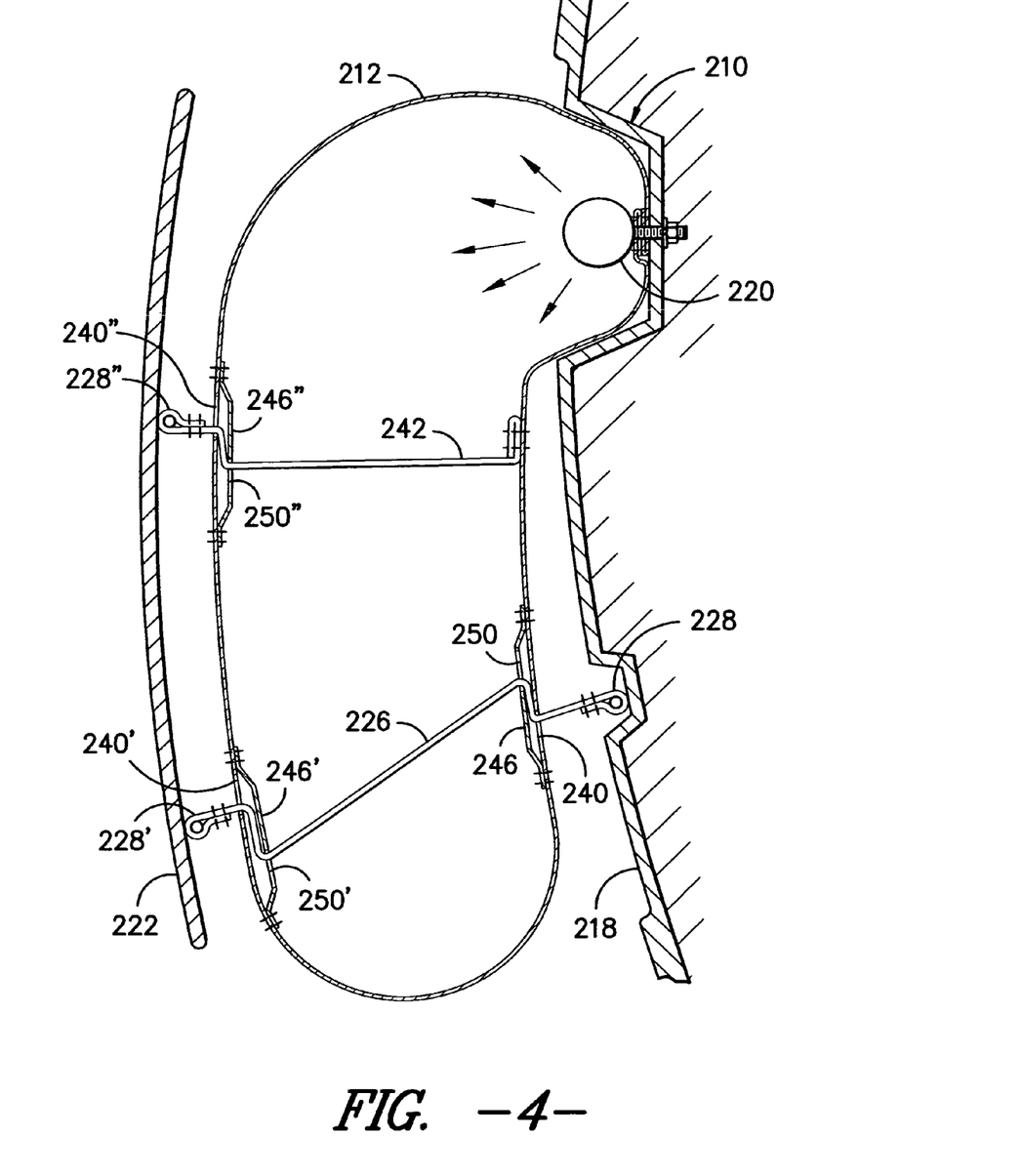
FIG. 4 is a view similar to FIG. 3 illustrating another exemplary tethering system incorporating elongate tethers extending in sliding relation through vent openings in airbag cushion walls.

FIG. 4 illustrates a contemplated tethering system wherein elements corresponding to those previously described are designated by like reference numerals increased by 200. In this arrangement a first elongate strap 226 extends from a first anchor position 228 along a travel path to a second anchor position 228'. Along the travel path, the first elongate strap 226 extends through vent openings 240, 240' such that the first elongate strap slides or floats within the vent openings 240, 240'. In the exemplary construction a second elongate strap 242 extends from an anchor position 228" at the impact panel 222 through a vent opening 240" for attachment to a wall of the cushion 212. Of course, the actual arrangement and number of tether elements may be adjusted depending upon the final desired configuration.

As illustrated, vent cover panels 246, 246', 246" of fabric, polymeric film or other pliable material are preferably disposed in attached relation at least partially across the vent openings 240, 240', 240". As shown, the vent cover panels 246, 246', 246" are preferably attached to the walls of the cushion 212 by seams outboard of the vent openings. The attachment to the cushion walls may be by sewn seams, adhesive seams or the like as may be desired. The vent cover panels preferably include openings 250, 250', 250" that are positioned out of alignment with the corresponding vent openings 240, 240', 240". The openings 250, 250', 250" may be at an interior portion of the cover panels or at a boundary edge such as by using a discontinuous seam attachment around the perimeter of the vent cover panels. As shown, the openings 250, 250', 250" are preferably sized so as to have a larger effective cross section than the elongate straps. Thus, the straps may normally slide freely through the openings in the vent cover panels.

In the illustrated construction wherein tethering straps extend through the vent openings 240, 240', 240" and misaligned openings 250, 250', 250", the introduction of inflation pressure may be used to substantially close the vent openings and lock down the tethering straps. Specifically, as pressure is built within the cushion 212, the portion of the vent cover panels overlying the vent openings is pushed into the vent openings in a plug-forming relation. As the vent openings 240, 240', 240" are closed, the tethering straps running through those opening are locked in place thus forming a secure tethering relation.

Figure 5:
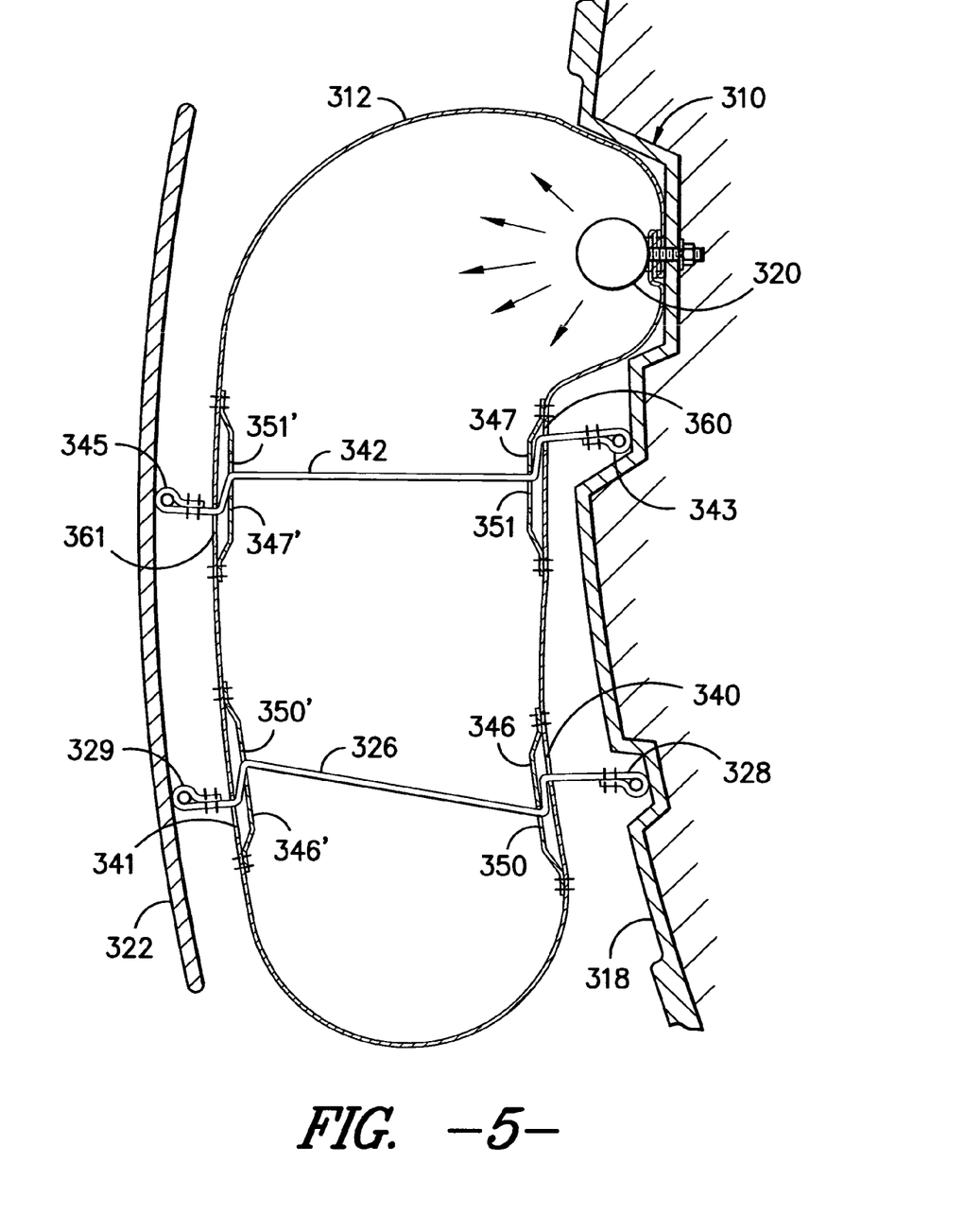
FIG. 5 is a view similar to FIG. 3 illustrating still another exemplary tethering system incorporating elongate tethers extending in sliding relation through vent openings in airbag cushion walls.

FIG. 5 illustrates another contemplated tethering system wherein elements corresponding to those previously described are designated by like reference numerals increased by 300. In this arrangement a first elongate strap 326 extends from a first anchor position 328 at the instrument panel 318 along a travel path to a second anchor position 329. Along the travel path, the first elongate strap 326 extends through vent openings 340, 341 such that the first elongate strap slides or floats within the vent openings 340, 341. In the exemplary construction a second elongate strap 342 extends from an anchor position 343 at the instrument panel along a travel path extending across the cushion 312 to anchor position 345 at the impact panel 322. Along the travel path, the second elongate strap 342 extends through vent openings 360, 361 such that the second elongate strap slides or floats within the vent openings 360, 361. Of course, the actual arrangement and number of tether elements may be adjusted depending upon the final desired configuration.

As illustrated, vent cover panels 346, 346', 347 and 347' of fabric, polymeric film or other pliable material are preferably disposed in attached relation at least partially across corresponding vent openings. As shown, the vent cover panels 346, 346', 347 and 347' are preferably attached to the walls of the cushion 312 by seams outboard of the vent openings. The attachment to the cushion walls may be by sewn seams, adhesive seams or the like as may be desired. The vent cover panels preferably include openings 350, 350', 351, 351' that are positioned out of alignment with the corresponding vent openings. The openings 350, 350', 351, 351' may be at an interior portion of the cover panels or at a boundary edge such as by using a discontinuous seam attachment around the perimeter of the vent cover panels. The openings 350, 350', 351, 351' are preferably sized so as to have a larger effective cross section than the elongate straps. Thus, the straps may normally slide freely through the openings in the vent cover panels.

In the illustrated construction wherein tethering straps extend through the vent openings and misaligned openings in the cover panels, the introduction of inflation pressure may be used to substantially close the vent openings and lock down the tethering straps. Specifically, as pressure is built within the cushion 312, the portion of the vent cover panels overlying the vent openings is pushed into the vent openings in a plug-forming relation. As the vent openings 350, 350', 351, 351' are closed, the tethering straps running through those opening are locked in place thus forming a secure tethering relation.

It is to be understood that while the present invention has been illustrated and described in relation to potentially preferred embodiments, constructions, and procedures, that such embodiments, constructions, and procedures are illustrative only and that the present invention is in no event to be limited thereto. Rather, it is contemplated that modifications and variations embodying the principles of the present invention will no doubt occur to those of skill in the art. In particular, it is to be understood that the present invention is in no way limited to any particular mechanism for the retention and release of tethering elements and that all description of such mechanisms is explanatory and exemplary only. It is therefore contemplated and intended that the present invention shall extend to all such modifications and variations as may incorporate the broad aspects of the present invention within the full spirit and scope thereof.

The invention claimed is:

1. An airbag safety system, the safety system comprising:
   an inflatable airbag cushion comprising at least a first gas vent opening disposed across a boundary wall of the airbag cushion;
   at least a first vent cover of pliable character disposed at least partially across said first gas vent opening, the first vent cover comprising an opening substantially misaligned with said first gas vent opening; and
   at least a first elongate tether extending from an anchor position through said first gas vent opening and through the opening in the first vent cover such that the elongate tether is normally disposed in sliding relation within said first gas vent opening, wherein upon inflation of the airbag cushion, the first vent cover is adapted to deform under pressure and at least partially plug the first gas vent opening.

2. The safety system according to claim 1, further comprising a non-inflatable occupant impact panel disposed in overlying relation to the airbag cushion, such that the impact panel is projected outwardly into contact with a vehicle occupant upon inflation of the airbag cushion, and wherein said first elongate tether is operatively connected to the impact panel.

3. The safety system according to claim 1, wherein at least one of the airbag cushion and the first vent cover comprises a textile fabric.

4. The safety system according to claim 1, wherein each of the airbag cushion and the first vent cover comprises a textile fabric.

5. The safety system according to claim 1, wherein the opening in the first vent cover comprises an aperture at an interior portion of the first vent cover.

6. The safety system according to claim 1, wherein the first elongate tether extends in a travel path across at least a portion of the airbag cushion such that the first elongate tether extends through an opening in a second vent cover and through a second gas vent opening and wherein the opening in the second vent cover and the second gas vent opening are substantially misaligned and wherein upon inflation of the airbag cushion, the second vent cover is adapted to deform under pressure and at least partially plug the second gas vent opening.

7. The safety system according to claim 5, wherein at least one of the airbag cushion and the second vent cover comprises a textile fabric.

8. The safety system according to claim 1, wherein each of the airbag cushion and the second vent cover comprises a textile fabric.

9. The safety system according to claim 1, further comprising at least a second elongate tether extending through a second gas vent opening and an opening in a second vent cover and wherein the opening in the second vent cover and the second gas vent opening are substantially misaligned and wherein upon inflation of the airbag cushion, the second vent cover is adapted to deform under pressure and at least partially plug the second gas vent opening.

10. The safety system according to claim 8, wherein the second elongate tether is affixed to the first elongate tether.

11. An airbag safety system adapted to cushion a vehicle occupant during an impact event, the safety system comprising:
    an inflatable airbag cushion comprising at least a first gas vent opening disposed across a boundary wall of the airbag cushion;
    at least a first vent cover of pliable character disposed at least partially across said first gas vent opening, the first vent cover comprising an opening substantially misaligned with said first gas vent opening; and
    at least a first elongate tether extending through said first gas vent opening and through the opening in the first vent cover such that the elongate tether is normally disposed in sliding relation within said first gas vent opening, wherein upon inflation of the airbag cushion, the first vent cover is adapted to deform under pressure and at least partially plug the first gas vent opening and wherein the first elongate tether extends in a travel path across at least a portion of the airbag cushion and is affixed to a boundary wall of the airbag cushion.

12. The safety system according to claim 11, further comprising a non-inflatable occupant impact panel disposed in overlying relation to the airbag cushion, such that the impact panel is projected outwardly into contact with a vehicle occupant upon inflation of the airbag cushion, and wherein said first elongate tether is operatively connected to the impact panel.

13. The safety system according to claim 11, wherein at least one of the airbag cushion and the first vent cover comprises a textile fabric.

14. The safety system according to claim 11, wherein each of the airbag cushion and the first vent cover comprises a textile fabric.

15. The safety system according to claim 11, wherein the opening in the first vent cover comprises an aperture at an interior portion of the first vent cover.

16. An airbag safety system adapted to cushion a vehicle occupant during an impact event, the safety system comprising:
    an inflatable airbag cushion comprising at least a first pair of gas vent openings disposed across boundary walls of the airbag cushion and at least a second pair of gas vent openings disposed across boundary walls of the airbag cushion;
    vent covers of pliable character disposed at interior positions of the airbag cushion at least partially across each gas vent opening in the first and second pairs of gas vent openings, each of said vent covers comprising an opening substantially misaligned with an opposing gas vent opening;
    a first elongate tether extending from an anchor position along a travel path through said first pair of gas vent openings and through the openings in the vent covers disposed across said first pair of gas vent openings, and a second elongate tether extending from an anchor position along a travel path through said second pair of gas vent openings and through the openings in the vent covers disposed across said second pair of gas vent openings such that the first elongate tether is normally disposed in sliding relation within the first pair of gas vent openings and the second elongate tether is normally disposed in sliding relation within the second pair of gas vent openings, wherein upon inflation of the airbag cushion, at least a portion of the vent covers are adapted to deform under pressure and at least partially plug opposing gas vent openings.

17. The safety system according to claim 16, further comprising a non-inflatable occupant impact panel disposed in overlying relation to the airbag cushion, such that the impact panel is projected outwardly into contact with a vehicle occupant upon inflation of the airbag cushion, and wherein said first elongate tether and said second elongate tether are each operatively connected to the impact panel.

18. The safety system according to claim 17, wherein at least one of the airbag cushion and a portion of the vent covers comprises a textile fabric.

19. The safety system according to claim 17, wherein each of the airbag cushion and the vent covers comprise a textile fabric.

* * * * *